S. STRUNZ.

Transparent Advertising Soap.

Reissued Aug. 31, 1875.

No. 6,624.

Witnesses;
A. H. Norris.
Geo. H. Graham.

Inventor:
Stephen Strunz
By James L. Norris
atty.

UNITED STATES PATENT OFFICE.

STEPHEN STRUNZ, OF PITTSBURG, PENNSYLVANIA.

IMPROVEMENT IN TRANSPARENT ADVERTISING-SOAPS.

Specification forming part of Letters Patent No. 165,628, dated July 13, 1875; reissue No. 6,624, dated August 31, 1875; application filed August 11, 1875.

*To all whom it may concern:*

Be it known that I, STEPHEN STRUNZ, of Pittsburg, in the county of Allegheny and State of Pennsylvania, have invented certain Improvements in Transparent Advertising-Soap, of which the following is a specification:

This invention relates to certain improvements in the manufacture of ornamental transparent soaps, its object being to produce or form within the body of the same ornamental designs, in transparent, translucent, or opaque colors, which shall appear or show through the transparent portions of the soap, and which shall be distinct and well defined, and free from all tendency of the colors running together during the process of manufacture.

My invention consists, first, in a new process of producing the designs, figures, or characters in the interior of a toilet cake or body of transparent soap, by printing, transferring, or drawing the said design, figure, or character upon a cake, tablet, or bar of transparent soap of less thickness than the finished tablet or cake, and in covering the designs, figures, or characters thus produced with an additional sheet or cake of similar transparent soap, forming a homogeneous body or solid cake, containing the predetermined design, figure, or character, in any desired transparent, translucent, or opaque colors, in the center of the cake or tablet of the soap; second, in a new article of manufacture, advertising-soap, consisting of a tablet, bar, or cake, composed of transparent soap material, and containing within the same designs, figures, or characters, of any description, in transparent, translucent, or opaque colors, produced or formed directly upon or within the soap compound, without the intervention of supporting materials.

Figure 1:
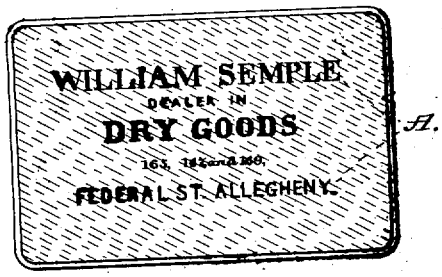
Figure 2:
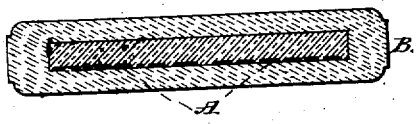
Figure 3:
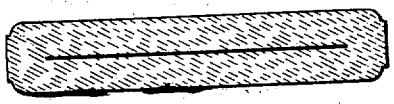

In the drawings, Figure 1 represents a cake of soap embodying my invention. Fig. 2 is a cross-section of the same.

The article is produced in the following manner: I first cast, mold, or otherwise form a tablet, cake, or bar of transparent soap, less in thickness than the completed or finished cake or tablet—generally of about half the thickness of the same. Upon such I print, transfer, or otherwise produce directly upon the surface of the same, designs, figures, or characters of any desired description, in either transparent, translucent, or opaque colors, in any convenient manner, as illustrated by the letter A.

Generally, however, I prefer to produce the characters, designs, or figures upon paper, in any convenient manner, in proper colors, and transfer the same to the tablet, by pressing such paper upon the soap in such manner as to fasten the coloring matter to the surface of the soap, and then removing the paper, leaving the design directly upon the surface of the transparent compound, without the intervention of a support for such design. Upon the cake or tablet thus formed, or around the same, I cast, mold, or otherwise produce a body of transparent soap, as illustrated by the letter B, forming a homogeneous and solid cake, with the designs, figures, or characters in coloring material alone, embedded directly in the transparent compound, without the intervention of foreign supporting substances, greatly cheapening the process of manufacture, and producing a superior article of soap, which, from the unusual transparency of the tablet and portions of the design, owing to the absence of supporting material around the designs, can readily be distinguished from any in the market.

Having thus described my invention, what I claim is—

1. The process herein described of producing ornamental designs, figures, or characters within the body of the soap, by printing, transferring, or otherwise producing the same in colors directly upon a tablet of transparent soap, and molding upon or otherwise combining with the same an additional tablet or cake of transparent soap, forming a homogeneous cake, substantially as described.

2. As a new article of manufacture, a cake or tablet of transparent soap having an ornamental design or figure produced within its body in pure colors, without the intervention of supporting materials for the same, substantially as described.

In witness whereof I have hereunto signed my name in the presence of two subscribing witnesses.

STEPHEN STRUNZ.

Witnesses:

HENRY STAUNER,
DANIEL WENKE, Jr.